(12) United States Patent  (10) Patent No.: US 7,693,558 B2
You et al.  (45) Date of Patent: Apr. 6, 2010

(54) WIRELESS COMMUNICATION TERMINAL FOR TRANSMITTING AND RECEIVING DATA AND METHOD THEREOF

(75) Inventors: Jin-Woo You, Seoul (KR); Chun-Ho Park, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 933 days.

(21) Appl. No.: 11/106,118

(22) Filed: Apr. 13, 2005

(65) Prior Publication Data

US 2005/0233784 A1  Oct. 20, 2005

(30) Foreign Application Priority Data

Apr. 14, 2004  (KR) ...................... 10-2004-0025922

(51) Int. Cl.
*H04B 1/10* (2006.01)
(52) U.S. Cl. .............. 455/575.3; 455/575.1; 455/575.2; 455/575.4; 370/338; 370/446
(58) Field of Classification Search .............. 455/575.3, 455/575.1, 575.2, 575.4
See application file for complete search history.

(56) References Cited

U.S. PATENT DOCUMENTS 7,203,522 B2 * 4/2007 Hama et al. .................. 455/566
2001/0016508 A1 * 8/2001 Kido et al. ................... 455/575
2002/0035692 A1 * 3/2002 Moriai ........................ 713/189
2003/0137986 A1 * 7/2003 Kaku et al. .................. 370/449
2003/0216157 A1 * 11/2003 Wang et al. .............. 455/575.1
2005/0107141 A1 * 5/2005 Sawada .................... 455/575.3
2005/0159189 A1 * 7/2005 Iyer ........................... 455/566

FOREIGN PATENT DOCUMENTS

KR  10-2005-0063554  6/2005

* cited by examiner

*Primary Examiner*—Matthew D Anderson
*Assistant Examiner*—Adel Youssef
(74) *Attorney, Agent, or Firm*—H.C. Park & Associates, PLC

(57) ABSTRACT

A wireless communication terminal transmitting/receiving data with a folder closed and a method thereof are disclosed. The wireless communication terminal includes: a wireless transceiver for transmitting and receiving data through a wireless communication network; a storage for storing the transmitted data and the received data; a detector for detecting a state of the folder of the wireless communication terminal in order to determine whether the folder is opened or closed; an outputting unit for indicating a result of the data transmission/reception; and a controller for analyzing the transmitted/received data to detect the last packet of the data, and continuing to perform the data transmission/reception without regard to the detected state of the folder until the last packet of the data has been detected.

14 Claims, 3 Drawing Sheets

WIRELESS COMMUNICATION TERMINAL FOR TRANSMITTING AND RECEIVING DATA AND METHOD THEREOF

CROSS REFERENCE TO RELATED APPLICATION

This application claims priority from and the benefit of Korean Patent Application No. 10-2004-0025922, filed on Apr. 14, 2004, which is hereby incorporated by reference for all purposes as if fully set forth herein.

FIELD OF THE INVENTION

The present invention relates to a wireless communication terminal having a function of transmitting and receiving multimedia files with a folder closed; and, more particularly, to a wireless communication terminal for continuously transmitting and receiving multimedia files when a folder is closed by a user while the wireless communication terminal are transmitting and receiving the multimedia files.

DESCRIPTION OF RELATED ARTS

A wireless communication terminal includes a mobile communication terminal, a personal communication station (PCS), a personal digital assistance (PDA), a smart phone, a next generation mobile communication terminal capable of handling data based on an international mobile telecommunication (IMT)-2000 and a wireless local area network terminal.

Recently, a sale growth of mobile telecommunication industry has been slowed by saturation of audio contents market such as downloadable bell sounds. Accordingly, the mobile telecommunication industry has been actively developing a wireless internet service for extending a data market to increase their sales. One of major contents in the recent wireless internet service is a multimedia messaging service (MMS). By using the MMS, a user can transmit and store multimedia files including a bell sound, a character, a photo and moving pictures including video on demand (VOD).

Furthermore, an enhanced messaging service (EMS) has also become a major wireless internet service. The EMS is an intermediate wireless internet service between a short message service (SMS) and the MMS for transmitting and receiving text and data larger than the SMS by increasing a packet size. Thus, multimedia data can be transmitted and received by using the EMS.

There are two conventional methods introduced for using the wireless internet service in order to transmit and receive multimedia files. In a first conventional method, a user accesses an internet server by using a wireless communication terminal including a mobile communication terminal or a personal data assistance (PDA) and uses a provided internet service for transmitting and receiving target multimedia files. That is, the user directly accesses a wireless application protocol (WAP) server by using user's terminal and downloads target multimedia contents from the WAP server.

The second conventional method is referred to as a web-to-phone service. In the web-to-phone service, the user access an application server which provides multimedia contents via web-site and if necessary, directly downloads target multimedia contents which may include a character, a bell sound, a photo or moving pictures to the wireless communication terminal.

According to the above mentioned two conventional methods, the user must open the folder of the wireless communication terminal, access the application server through wireless/wired communication service, and then request transmitting/receiving the target multimedia files. However the user must maintain the folder opened while the target multimedia files are transmitted/received. This means the user must be attentive in order not to close the folder of the wireless communication terminal until transmission/reception of the target multimedia files is completed.

According to conventional method concerning Short Message Service (SMS), it also takes comparatively long time to transmit one short message to two or more wireless terminals at the same time. Particularly, when the wireless communication terminal transmits or receives a comparatively large quantity of multimedia message based on the previous conventional method, it requires somewhat a lot of time.

Furthermore, the user has to maintain the folder opened certainly for quite some time until transmission/reception of the multimedia files is completed if there are many subscribers within the same cell who request access to an allocated channel for transmitting and receiving data since they need quite much time for transmitting and receiving data due to the lack of capacity in the allocation channel of the network.

Moreover, if the user unintentionally closes the folder in the middle of the transmission/reception of the target multimedia files, the operation of transmitting/receiving multimedia data is interrupted. In such a case that transmission/reception of the multimedia files is interrupted by the user unexpectedly closing the folder, the user has to perform the operation of transmitting/receiving multimedia data over again from the beginning.

In the meantime, the displayer of the wireless communication terminal has to be maintained as powered on until the transmission/reception of the multimedia data is completed. This causes wasteful electric power consumption.

SUMMARY OF THE INVENTION

It is, therefore, an object of the present invention to provide a wireless communication terminal having a function of transmitting/receiving data with a folder of the wireless communication terminal closed and a method for continuously transmitting and receiving data without break even though the folder is unintentionally closed without compulsory interruption by a user.

It is another object of the present invention to provide a wireless communication terminal having a function of transmitting/receiving data with a folder closed, the terminal that can determine whether the wireless communication terminal is in progress of data transmission/reception, continuously performing the data transmission/reception without regard to a state of a folder of the wireless communication terminal if the wireless communication terminal is in progress of data transmission/reception, and outputting an operation-completion message in the form of reserved text, sound and the like when the data transmission is completed.

In accordance with an aspect of the present invention, there is provided a wireless communication terminal having a function of transmitting/receiving data with a folder of the wireless communication terminal closed, the wireless communication terminal including: a wireless transceiver for transmitting and receiving data through a wireless communication network; a storage for storing the transmitted data and the received data; a detector for detecting a state of the folder of the wireless communication terminal in order to determine whether the folder is opened or closed; an outputting unit for indicating a result of the data transmission/reception; and a controller for analyzing the transmitted/received data to detect the last packet of the data, and continuing to perform the data transmission/reception without regard to the detected state of the folder until the last packet of the data has been detected.

In accordance with another aspect of the present invention, there is provided a method for transmitting/receiving data with a folder of the wireless communication terminal closed, the method includes the steps of: a) determining in a controller whether the wireless communication terminal is in the middle of data transmission/reception; b) continuously performing the data transmission/reception in the controller without regard to a state of the folder of the wireless communication terminal; c) generating a operation-completion signal in the controller when the data transmission/reception is completed and outputting the generated operation-completion signal to an outputting unit; d) detecting a state of the folder as an opened state in a detector when the folder is opened again; and e) displaying a result of the data transmission/reception in the output unit.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, a wireless communication terminal having a function of transmitting and receiving data with a folder closed in accordance with a preferred embodiment of the present invention will be described in more detail with reference to the accompanying drawings.

Figure 1:
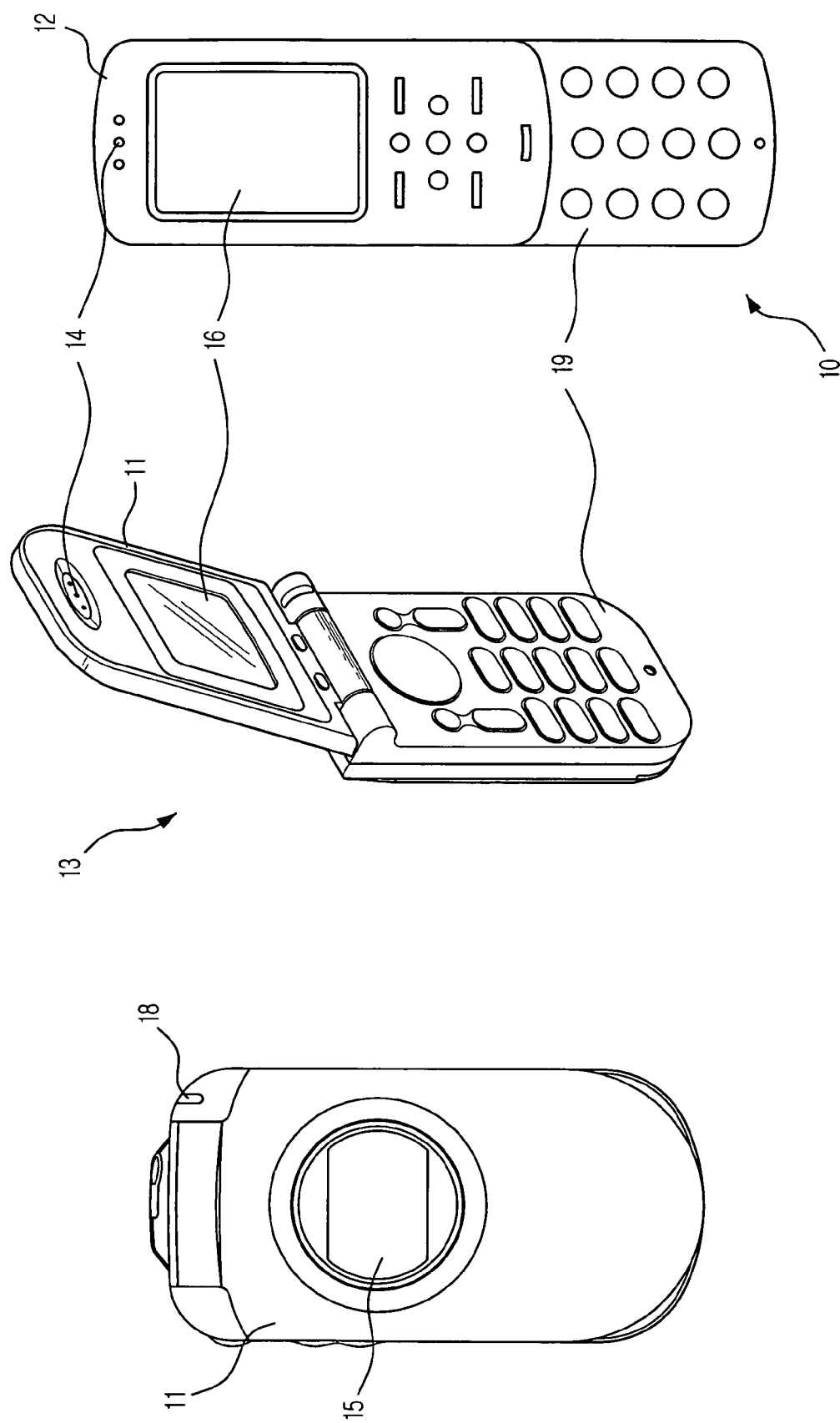
FIG. 1 is a perspective view showing wireless communication terminals having a function of transmitting and receiving data with a folder closed in accordance with a preferred embodiment of the present invention.

FIG. 1 is a perspective view showing wireless communication terminals having a function of transmitting and receiving data with a folder closed in accordance with a preferred embodiment of the present invention. FIG. 1 shows a slide type wireless communication terminal 10 and a folder type wireless communication terminal 13.

As shown in FIG. 1, both of the wireless communication terminals 10 and 13 include folders 11, 12, respectively and a main body 19. The folders 11 and 12 mean a folder 11 and a slide 12 which is provided with the main displayer 16 other than the main body 19 in the folder-type wireless communication terminal 13 and a slide-type mobile communication terminal 10. The folders 11, 12 include a main displayer 16, a voice/audio outputting unit 14 and an answering lamp 18 which blinks when a phone call is made/received.

The main displayer 16 displays a reserved message corresponding to a result of commencing data transmission/reception: the reserved message may refer to data transmission/reception completion, data transmission/reception failure, or it could be a message for requesting a user to repeatedly attempt to perform the data transmission/reception. The voice/audio outputting unit 14 outputs a corresponding voice or sound according to the result of commencing data transmission/reception. The answering lamp 18 may also blink with single/several colors periodically to inform that the data transmission/reception is completed. The answering lamp 18 may be used as a flash for a camera. The folder 11 further comprises a sub-displayer 15 which is externally disposed on the folder 14 for outputting an operation-completion signal when data transmission/reception is completed.

Figure 2:
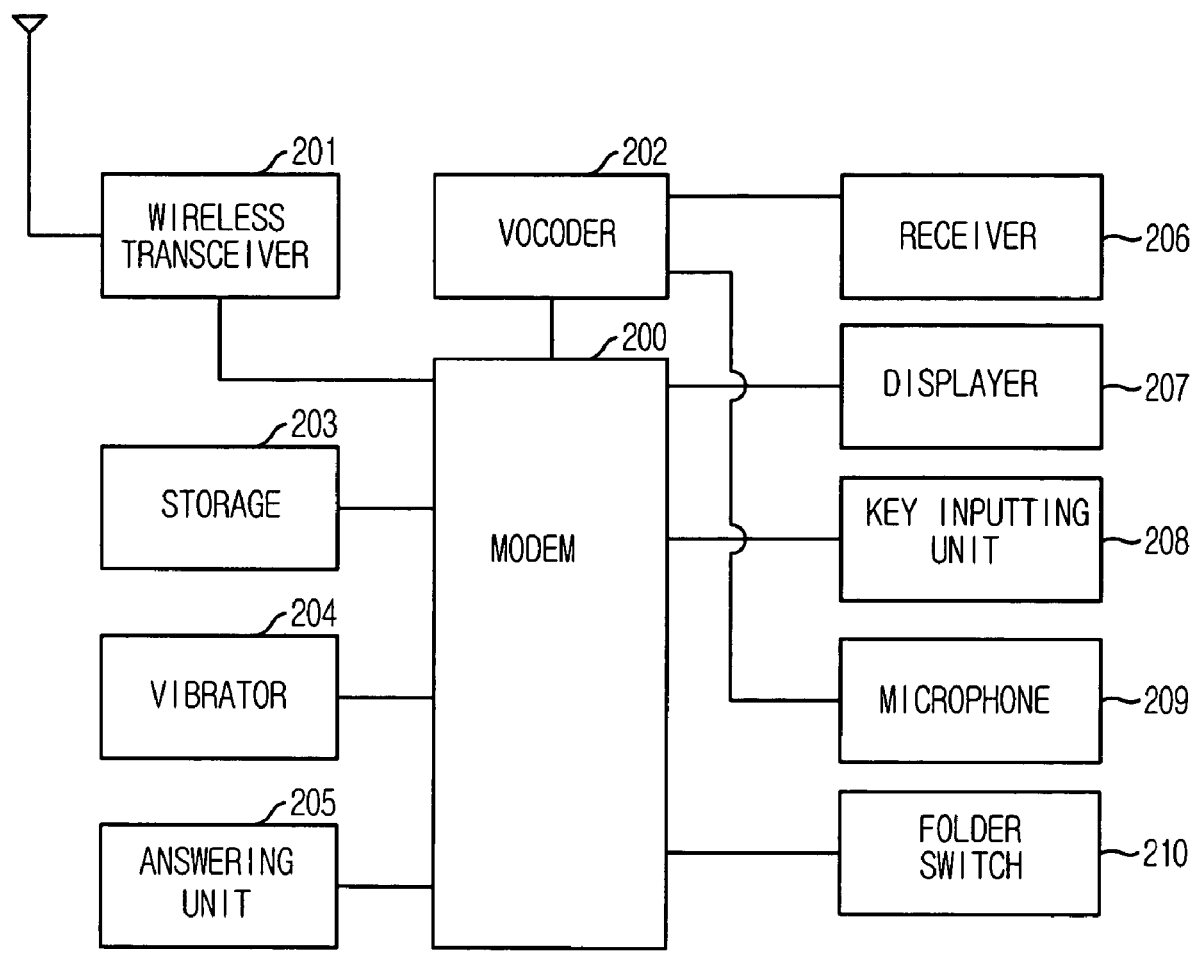
FIG. 2 is a block diagram illustrating a wireless communication terminal having a function of transmitting and receiving data with a folder closed in accordance with a preferred embodiment of the present invention.

FIG. 2 is a block diagram illustrating a wireless communication terminal having a function of transmitting and receiving data with a folder closed in accordance with a preferred embodiment of the present invention.

As shown in FIG. 2, the wireless communication terminal includes MODEM 200, a wireless transceiver 201, a vocoder 202, a storage 203, a vibrator 204, an answering lamp 205, a receiver 206, a displayer 207, a key inputting unit 208, a microphone 209 and a folder switch 210.

The wireless transceiver 201 receives and transmits radio signals through an antenna.

The transmitted data such as short messages and multimedia messages is stored in the storage 203 after demodulated and analyzed in the MODEM 200. The storage 203 also outputs stored corresponding data according to a data request signal from the MODEM 200.

The VOCODER 202 encodes a voice/sound signal inputted from the microphone 209 and the MODEM 200 modulates the coded voice/sound signal with a transmitting signal to transmit the transmitting signal through the antenna.

The folder switch 210 detects a state of the folder of the wireless communication terminal for determining whether the folder is opened or closed. The folder comprises the folder 11 or the slide 12 in FIG. 1.

The receiver 206 outputs the voice/sound signal decoded at the VOCODER 202 in the form of acoustic sound. Also, as the receiver 206 receives an operation-completion signal or an incoming calling signal from the MODEM 200, it outputs a corresponding sound reserved for the operation-completion signal or the incoming calling signal for informing that the data transmission/reception is completed or the calling signal is coming to the wireless communication terminal.

The microphone 209 receives the voice/sound signal and transfers the received voice/sound signal to the VOCODER 202.

The answering lamp 205 may indicate the data transmission/reception is completed or the calling signal is coming by blinking one or more colors of light representing either the state that data transmission/reception is being processed or the state that the calling-signal is received.

The vibrator 206, which receives the operation-completion signal or the incoming calling signal from the MODEM 200 may vibrate to indicate that the data transmission/reception is completed or that the calling signal is coming.

The displayer 207 may display various messages assigned to a specific control signal of the MODEM 200 which represents the state of data transmission/reception, i.e., failure or success. The messages would be to ask the user to retry performing the data transmission/reception under data transmission, or they would be possibly a telephone number of a caller under voice calling procedure. The displayer 207 may also display the received data: an image data, a text data, a short message and a multimedia message.

The key inputting unit 208 receives telephone numbers or text for short message and phone book, a call connection signal and a confirmation signal for re-performing the data transmission/reception from a user with various function keys and numeric keys.

The MODEM 200 controls overall operations of the wireless communication terminal by controlling sub-elements of the wireless communication terminal including the wireless transceiver 201, the compression/decompression (VOCODER) 202, the storage 203, the vibrator 204, the answering lamp 205, the receiver 206, the displayer 207, the key inputting unit 208, the microphone 209 and the folder switch 210. Particularly, the MODEM 200 of the present invention determines whether the wireless communication terminal is in the procedure of the data transmission/reception, performs the data transmission/reception without consideration of the states that the folder is opened or closed if the terminal is under the progress of data transmission/reception, generates the operation-completion signal according to the result (success or failure) of the data transmission/reception to the receiver and also outputs corresponding messages, which are stored in the storage, representing the result of the data transmitting/receiving operation when the terminal detects that the folder is re-opened from the folder switch 210.

Hereinafter, the entire operation procedure of the wireless terminal according to the present invention will be described by referring to FIG. 3.

Figure 3:
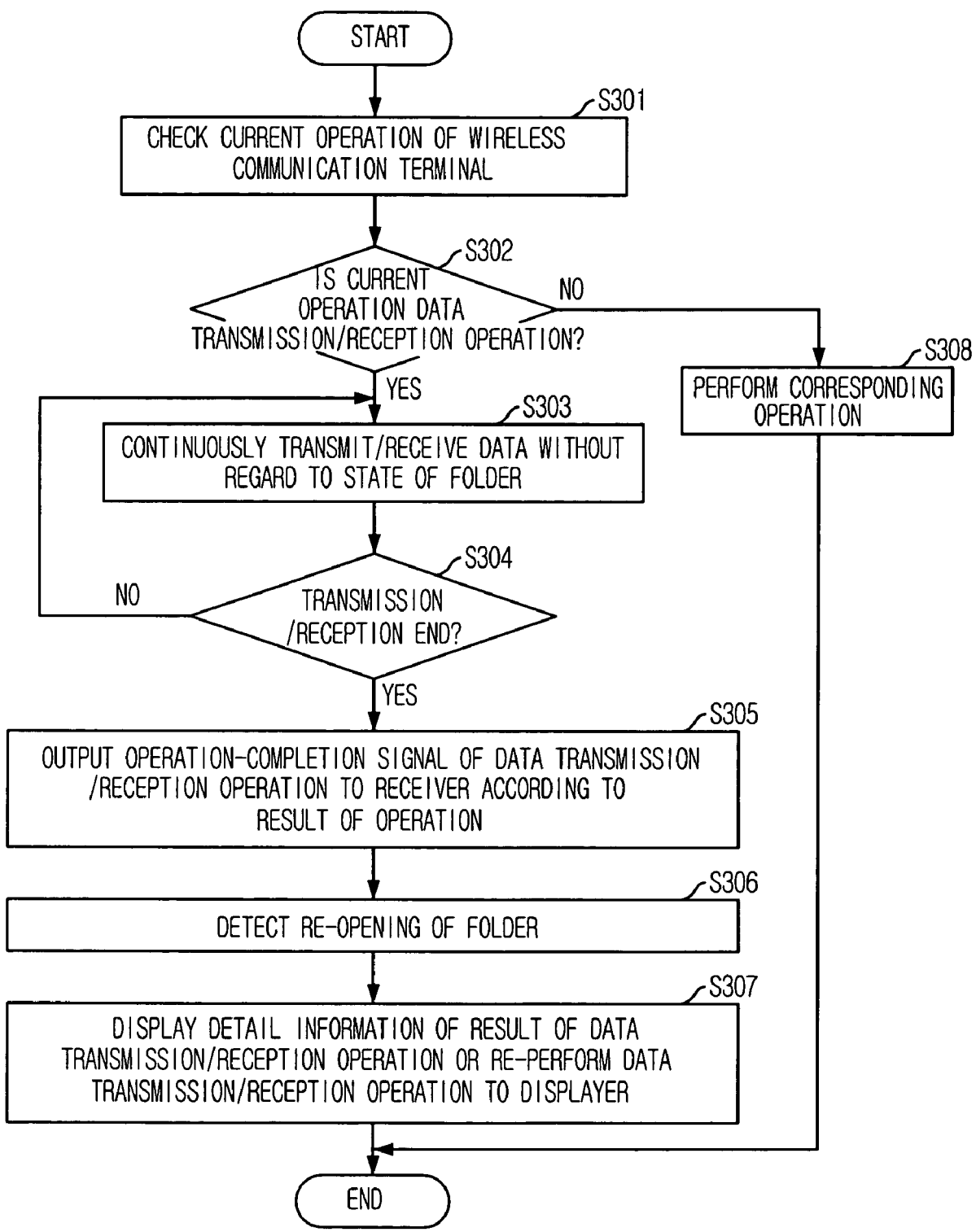
FIG. 3 is a flowchart showing a method for continuously transmitting/receiving data when a folder of a wireless communication terminal is closed during the data transmission/reception in accordance with a preferred embodiment of the present invention.

FIG. 3 is a flowchart showing a method for transmitting/receiving data even with a state that a folder is closed after the data transmission/reception begins in accordance with a preferred embodiment of the present invention.

As shown in FIG. 3, the MODEM 200 of the wireless communication terminal checks a current mode of operation of the wireless communication terminal at step S301 and determines whether the current mode of operation is in the data transmission/reception or not at step S302.

If the current operation is not in the data transmission/reception at step S302, the terminal performs the current operation continuously and terminates at step S308. If the current operation is in the data transmission/reception at step S302, the terminal keeps performing the data transmission/reception without consideration of the state of the folder of the wireless communication terminal at step S303. That is, the data transmission/reception continues to be performed even when the folder is closed at the step S303.

After then, an associated operation-completion signal is generated according to the result (failure or success) of the data transmission/reception and the corresponding message associated with the generated operation-completion signal is provided to the user in the form of audible sounds or visible messages at step S305. Thus the terminal can notify a user of the data transmission/reception result with the receiver 206, the vibrator 204, the answering lamp 205, and the sub-displayer 15 of the folder type wireless communication terminal 13 and a main displayer 16 of the slide type wireless communication terminal 10. The sub-displayer 15 and the main displayer 16 display associated messages, which represent failure or success, according to the result of data transmission/reception for notifying that the terminal has succeeded in the data transmission/reception or notifying that the terminal has failed in the data transmission/reception. The sub-displayer 15 and the main displayer 16 display an associated message inquiring to a user about whether the terminal continues to try performing the data transmission/reception which once failed and can also display the received data in the form of a linked icon or an activated pop-up window on their screen.

The operation-completion signal may be provided with the one selected notifier. The operation-completion signal may also be provided with the vibrator 204, the answering lamp 205 and the receiver 206 at the same time. Also, one or more notifiers can be combined from the vibrator 204, the answering lamp 205 and the receiver 206 as the terminal sets configured by a user. The sub-displayer 15 and the main displayer 16 always display the associated messages for representing the result (failure or success) of data transmission/reception to indicate that the terminal has succeeded in the data transmission/reception or indicate that the terminal has failed in the data transmission/reception. In case the data transmission/reception has been failed, both displayers may display the message for the terminal to request data transmission/reception or the other message for the terminal to quit trying the data transmission/reception.

After then, if the MODEM 200 receives a signal from the folder switch 210 indicating that the folder 11 or 12 is opened at step S306, the MODEM 200 generates a message for detailed information about the result of the data transmission/reception and the number of attempts set by the user for re-performing the data transmission/reception at step S307. The main displayer 16 may be provided with the associated messages with the result of data transmission/reception from the MODEM 200 and display the messages on its screen.

Herein, the messages also represent a location of stored multimedia files or a title of the transmitted/received multimedia files or the time required to transmit/receive the multimedia files in case that the data transmission/reception is successfully completed and thus no further attempt is made to transmit/receive the files.

On the contrary, when the terminal has failed in the data transmission/reception, the displayer 16 displays the message that the terminal will attempt to re-perform the data transmission/reception as many times as the number of attempts set by the user.

As mentioned above, the wireless communication terminal of the present invention continues to perform the data transmission/reception even when the folder is closed, while transmitting/receiving messages in services such as the SMS, MMS, or EMS. Therefore, the user needs not see and wait until the data transmission/reception is completed with the folder of the terminal open.

Also, the present invention can prevent transmission/reception of data from involuntarily being terminated even if the folder is unintentionally closed while transmitting/receiving data.

Furthermore, the present invention can also reduce power consumption of the wireless communication terminal since the main displayer need not be powered while performing the data transmission/reception with the folder closed.

The present application contains subject matter related to Korean patent application No. 10-2004-0025922, filed in the Korean patent office on Apr. 14, 2004, the entire contents of which being incorporated herein by reference.

While the present invention has been described with reference to certain preferred embodiments, it will be apparent to those skilled in the art that various changes and modifications may be made without departing from the spirits and scope of the invention as defined in the following claims.

What is claimed is:

1. A wireless communication terminal having a function of transmitting/receiving data, the wireless communication terminal comprising:

a wireless transceiver to transmit and receive data through a wireless communication network;

a storage to store the transmitted data and the received data;

a detector to detect a state of a folder of the wireless communication terminal in order to determine whether the folder is opened or closed;

an outputting unit to indicate a result of the data transmission/reception; and a controller to analyze the transmitted/received data to detect a last packet of the data, and to continue to perform the data transmission/reception regardless of the detected state of the folder until the last packet of the data has been detected, wherein the controller generates an operation-completion signal when the last packet of the data is detected, and outputs the generated operation-completion signal to the outputting unit, and wherein the outputting unit produces a notification of the data transmission/reception result to a user upon receiving the operation-completion signal, the outputting unit displays an associated information with the result of the data transmission/reception and time required to complete the data transmission/reception when the data transmission/reception is successfully completed, and the outputting unit also displays an associated information with the reason of failing in the data transmission/reception and a message inquiring whether the wireless communication terminal will repeatedly continue to perform the data transmission/reception by the predetermined number of times when the data transmission/reception is failed.

2. The wireless communication terminal as recited claim 1, further comprising at least one key to receive a confirmation signal for performing a data transmission/reception.

3. The wireless communication terminal as recited claim 1, wherein the outputting unit includes a displayer to display an associated message representing the result of the data transmission/reception.

4. The wireless communication terminal as recited in claim 3, wherein the displayer is externally disposed on the folder.

5. The wireless communication terminal as recited in claim 1, wherein the outputting unit includes at least one among a displayer, a vibrator, an answering lamp and a receiver.

6. The wireless communication terminal as recited in claim 1, wherein data comprises Short Message Service (SMS) message, Multimedia Messaging Service (MMS) message or Enhanced Messaging Service (EMS) message.

7. A method for transmitting/receiving data with a folder of a wireless communication terminal closed, the method comprising the steps of:

a) determining in a controller whether the wireless communication terminal is performing data transmission/reception;

b) continuously performing the data transmission/reception in the controller regardless of a state of the folder of the wireless communication terminal until a last packet of the data has been detected;

c) generating an operation-completion signal in the controller when the data transmission/reception is completed and outputting the generated operation-completion signal to an outputting unit;

d) detecting a state of the folder as an opened state in a detector if the folder is opened again; and e) displaying a result of the data transmission/reception in the outputting unit.

8. The method as recited in claim 7, wherein the step c) comprises the step of:

c-1) generating the operation-completion signal according to a result that indicates a failure or a success of the data transmission/reception and outputting the generated operation-completion signal to an externally disposed displayer as an associated message with the transmission result.

9. The method as recited in claim 8, wherein the step c) further comprises the step of:

c-2) generating the operation-completion signal according to the result that indicates the failure or the success of the data transmission/reception and outputting the generated operation-completion signal to an audio or video outputting unit as a voice or a sound.

10. The method as recited in claim 8, wherein the step c) further comprises the step of:

c-3) generating the operation-completion signal according to the result that indicates the failure or the success of the data transmission/reception and outputting the generated operation-completion signal as light to an answering lamp.

11. The method as recited in claim 8, wherein the step c) further comprises the step of:

c-4) generating the operation-completion signal according to the result that indicates the failure or the success of the data-transmission/reception and outputting the generated operation-completion signal to a vibrator as vibrating.

12. The method as recited in claim 7, wherein the step e) comprises the steps of:

e-1) displaying an associated information with the result of the data transmission/reception and time required to complete the data transmission/reception when the data transmission/reception is successfully completed; and e-2) displaying an associated information with the reason of failing in the data transmission/reception and a message inquiring whether the wireless communication terminal will repeatedly continue to perform the data transmission/reception by the predetermined number of times when the data transmission/reception is failed.

13. The wireless communication terminal as recited claim 1, wherein the folder is a folder which is provided with the main displayer other than the main body.

14. The wireless communication terminal as recited claim 1, wherein the folder is a slide which is provided with the main displayer other than the main body.

* * * * *